(12) United States Patent
Nagasawa

(10) Patent No.: US 10,194,047 B2
(45) Date of Patent: Jan. 29, 2019

(54) INFORMATION PROCESSING DEVICE AND NON-TRANSITORY RECORDING MEDIUM

(71) Applicant: Konica Minolta, Inc., Chiyoda-ku, Tokyo (JP)

(72) Inventor: Kenichi Nagasawa, Takatsuki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/664,359

(22) Filed: Jul. 31, 2017

(65) Prior Publication Data

US 2018/0063364 A1    Mar. 1, 2018

(30) Foreign Application Priority Data

Sep. 1, 2016   (JP) ................................. 2016-170650

(51) Int. Cl.
*G06F 15/00*   (2006.01)
*H04N 1/32*   (2006.01)
(Continued)

(52) U.S. Cl.
CPC ....... *H04N 1/32069* (2013.01); *G06F 3/1292* (2013.01); *H04L 67/16* (2013.01);
(Continued)

(58) Field of Classification Search
CPC .... G06F 3/1285; G06F 3/1238; G06F 3/1222; G06F 3/121; G06F 3/1205; G06F 3/1207;
(Continued)

(56) References Cited

U.S. PATENT DOCUMENTS 9,351,239 B2   5/2016   Okamoto
2007/0030516 A1   2/2007   Tsuji et al.
(Continued)

FOREIGN PATENT DOCUMENTS

JP   2009-77435 A   4/2009
JP   2010-239462 A   10/2010
JP   2016-21654 A   2/2016

OTHER PUBLICATIONS

Extended European Search Report issued in corresponding European Patent Application No. 17188119.6-1853, dated Nov. 16, 2017 (12 pages).

*Primary Examiner* — Saeid Ebrahimi Dehkordy

(74) *Attorney, Agent, or Firm* — Buchanan Ingersoll & Rooney PC

(57) ABSTRACT

An information processing device includes a first wireless communicator that establishes a short-range wireless communication with a first image forming device in a local network and a second wireless communicator that establishes a wireless communication with a wireless communicator device connected to the local network, comprising a hardware processor that: enables the first wireless communicator to establish the short-range wireless communication with the first image forming device, thereby obtaining an IP address of the first image forming device in the local network; and enables the second wireless communicator to send a search command for searching for a second image forming device in the local network to the local network using unicast transmission via the wireless communicator device based on the IP address of the first image forming device.

21 Claims, 13 Drawing Sheets

FIG. 1

(51) Int. Cl.
*H04N 1/00* (2006.01)
*H04L 29/08* (2006.01)
*G06F 3/12* (2006.01)
*H04W 8/00* (2009.01)
*H04W 4/80* (2018.01)
*H04W 84/12* (2009.01)
*H04L 29/12* (2006.01)

(52) U.S. Cl.
CPC ..... *H04N 1/00278* (2013.01); *H04N 1/00307* (2013.01); *H04N 1/00315* (2013.01); *H04N 1/32117* (2013.01); *H04W 8/005* (2013.01); *H04L 61/1541* (2013.01); *H04N 2201/006* (2013.01); *H04N 2201/0039* (2013.01); *H04N 2201/0094* (2013.01); *H04N 2201/3208* (2013.01); *H04W 4/80* (2018.02); *H04W 84/12* (2013.01)

(58) Field of Classification Search
CPC ............. H04N 1/00413; H04N 1/0015; H04N 1/00053; H04N 1/00076
USPC ....................................... 358/1.15
See application file for complete search history.

(56) References Cited

U.S. PATENT DOCUMENTS

2016/0019007 A1  1/2016  Kurihara
2016/0261975 A1* 9/2016  Kurihara ............... H04W 8/005

* cited by examiner

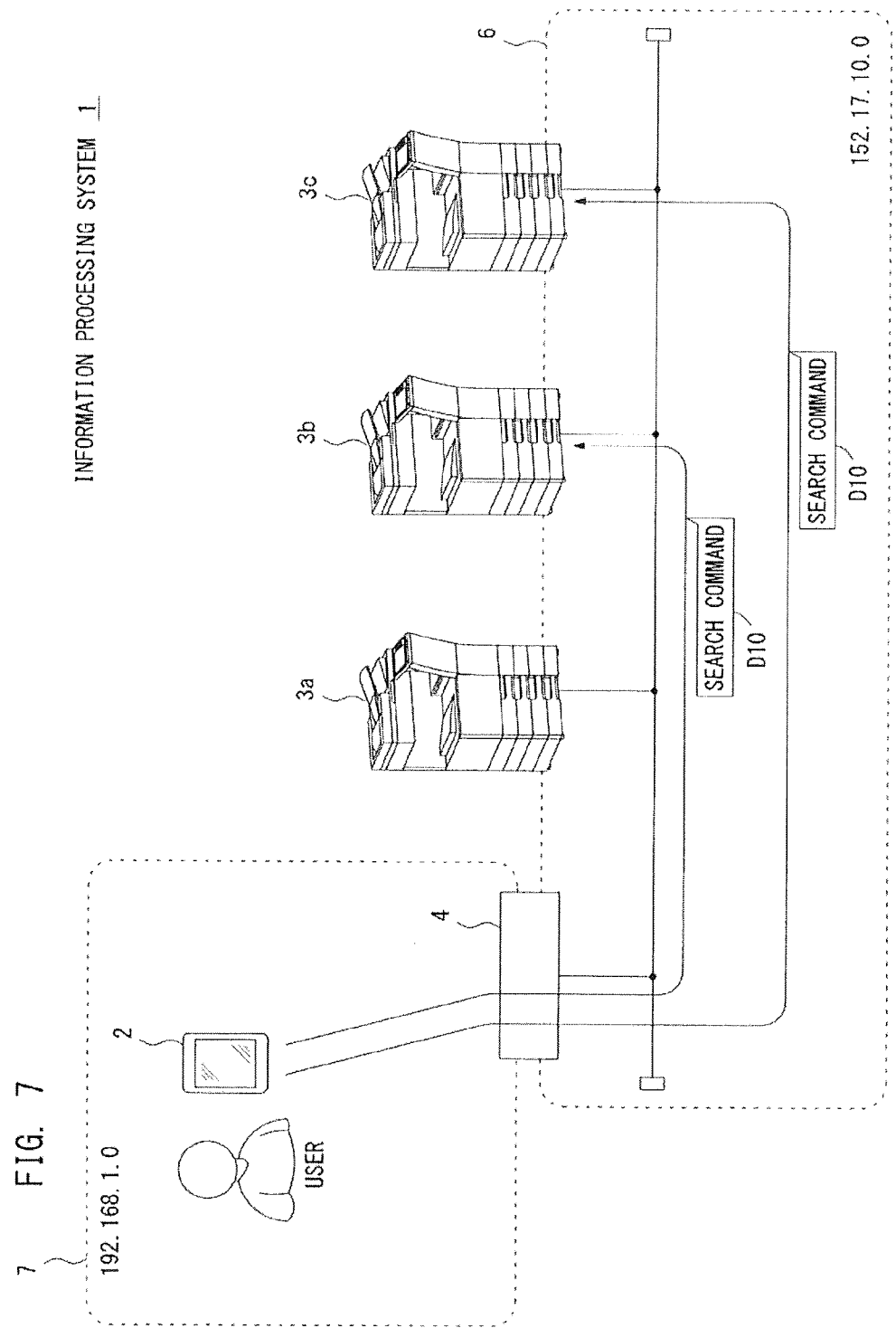

FIG. 10
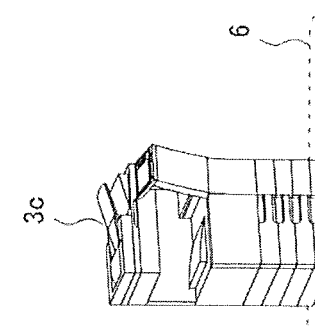
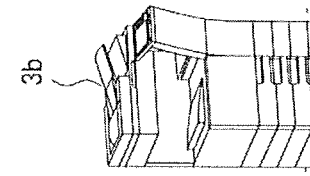
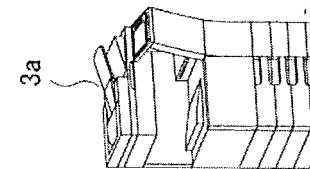
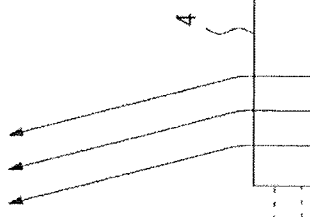
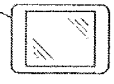
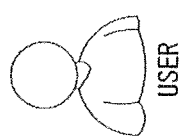

INFORMATION PROCESSING DEVICE AND NON-TRANSITORY RECORDING MEDIUM

Japanese patent application No. 2016-170650 filed on Sep. 1, 2016 including description, claims, drawings, and abstract the entire disclosure is incorporated herein by reference in its entirety.

BACKGROUND

Technological Field

The present invention relates to an information processing device and a non-transitory recording medium. The present invention more specifically relates to a technique for the information processing device to search for an image forming device by using a wireless communication.

Description of the Related Art

Portable information processing devices such as smartphones or tablet terminals establish wireless communication complying with wireless LAN standards such as WiFi so that they are allowed to send print data to image forming devices. This type of information processing devices is carried by users. The communication environment changes depending on the location of the user. When an application to send the print data is run, it is general for the information processing device to broadcast a search command to detect the communicable image forming device under the current communication environment.

A wireless communicator device relays a wireless communication via a wireless LAN to a local network to which the image forming device is connected. The wireless communicator device sometimes is in operation in a router mode. The router mode separates a network for the wireless communication via the wireless LAN and the local network to which the image forming device is connected to manage. It is assumed that the information processing device broadcasts the search command to the wireless LAN network. Even in such a case, the search command is not transferred to the local network to which the image forming device is connected when the wireless communicator device is in operation in the router mode. The wireless communicator device blocks the search command. The information processing device is not allowed to detect the image forming device in another local network the wireless communicator device is connected.

In order to solve the above-described problem, an information collecting server is conventionally installed in each network that is connected via a router. This known technique is introduced for example in Japanese Patent Application Laid-Open No. JP 2009-77435 A. According to the known technique, each information collecting server collects information relating to devices connected to the same network as itself. The information collecting server provides the device in another network with the collected device information.

The aforementioned known technique, however, requires installation of the information collecting server in each network, resulting in a complicated and big system structure which cannot avoid high cost.

SUMMARY

The present invention is intended to solve the above problems. Thus, the present invention is intended to provide an information processing device and a non-transitory recording medium capable of collecting information of an image forming device relatively easily and reasonably without a need for development of any complicated system structure.

First, the present invention is directed to an information processing device includes a first wireless communicator that establishes a short-range wireless communication with a first image forming device in a local network and a second wireless communicator that establishes a wireless communication with a wireless communicator device connected to the local network.

To achieve at least one of the abovementioned objects, according to an aspect of the present invention, the information processing device reflecting one aspect of the present invention comprises a hardware processor that: enables the first wireless communicator to establish the short-range wireless communication with the first image forming device, thereby obtaining an IP address of the first image forming device in the local network; and enables the second wireless communicator to send a search command for searching for a second image forming device in the local network to the local network using unicast transmission via the wireless communicator device based on the IP address of the first image forming device.

Second, the present invention is directed to a non-transitory recording medium storing a computer readable program to be executed by an information processing device.

To achieve at least one of the abovementioned objects, according to an aspect of the present invention, the non-transitory recording medium reflecting one aspect of the present invention stores the computer readable program to be executed by the information processing device that includes: a first wireless communicator that establishes a short-range wireless communication with a first image forming device in a local network; and a second wireless communicator that establishes a wireless communication with a wireless communicator device connected to the local network. Execution of the computer readable program by the information processing device causing the information processing device to perform; enabling the first wireless communicator to establish the short-range wireless communication with the first image forming device, thereby obtaining an IP address of the first image forming device in the local network; and enabling the second wireless communicator to send a search command for searching for a second image forming device in the local network to the local network using unicast transmission via the wireless communicator device based on the IP address of the first image forming device.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIG. 7 shows an example of a transmission of a search command by a unicast search part;

FIG. 10 shows an example of a response by the image forming device to the attribution information request;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
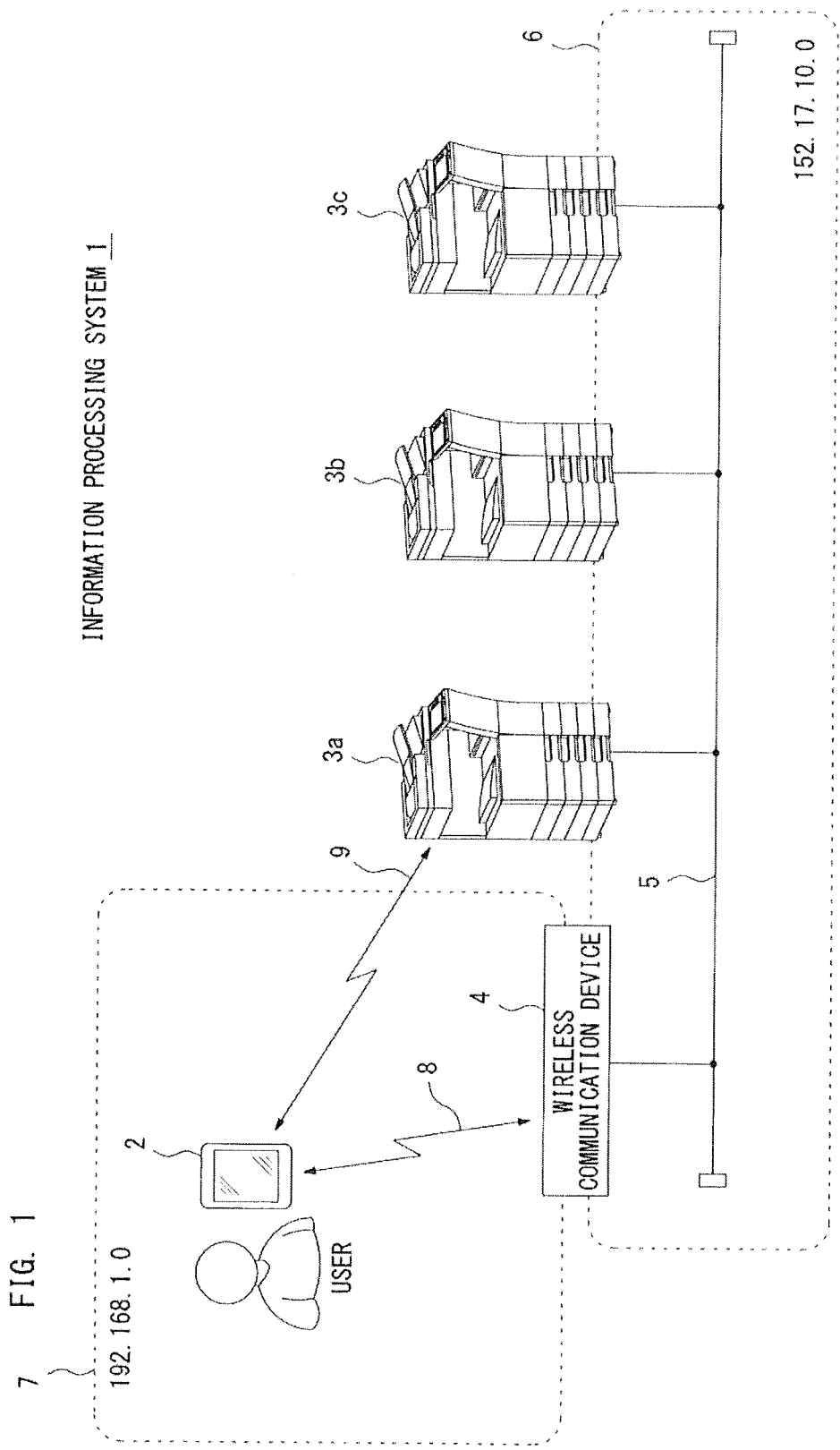
FIG. 1 shows an exemplary configuration of an information processing system including an information processing device.

FIG. 1 shows an exemplary configuration of an information processing system 1 including an information processing device 2 of the present invention. The information processing system 1 is a network system comprising two local networks 6 and 7 connected to each other via a wireless communicator device 4. The local network 6 is a wired network connecting multiple image forming devices 3a, 3b and 3c and the wireless communicator device 4 via a LAN (Local Area Network) cable 5. However, this is given not for limitation. The local network 6 does not have to be the wired network. It may be a wireless network. In the example of FIG. 1, a network address of the local network 6 is "152. 17. 10. 0." On the other hand, the local network 7 is a wireless network established by the wireless communicator device 4. The local network 7 establishes the wireless communication complying with wireless LAN standards such as WiFi. In the example of FIG. 1, the network address of the local network 7 is "192. 168. 1. 0."

The wireless communicator device 4 has a function to relay the wireless communication between the multiple devices in the local network 7. The wireless communicator device 4 is also connected to the local network 6. The wireless communicator device 4 has a router function. When a packet is transmitted to one of the local networks 6 or 7, the wireless communicator device 4 analyzes an IP address of the packet and determines whether or not to transmit the packet to another local network 7 or 6. To be more specific, the wireless communicator device 4 determines whether to pass or block the information to another local network 7 or 6 based on the IP address specified as an address of the information transmitted to each local network 6 and 7. The wireless communicator device 4, for instance, blocks a command broadcasted in the local network 7, and does not transmit such command to the local network 6.

The image forming devices 3a, 3b and 3c constructed by devices such as MFPs (Multifunction Peripherals), for example, have multiple functions including a scan function, a print function and a facsimile function. However, this is given not for limitation. The image forming devices 3a, 3b and 3c do not always have to be the devices having aforementioned multiple functions. They may be devices only having the print function. Once the image forming devices 3a, 3b and 3c receive print data over the local network 6, they are capable of producing printed outputs based on the print data. At least the image forming device 3a of the multiple image forming devices 3a, 3b and 3c of the present preferred embodiment has a short-range wireless communication function such as NFC (Near Field Communication) and/or Bluetooth. The image forming device 3a is capable of establishing a short-range wireless communication 9 with the information processing device 2, for example.

The information processing device 2 is constructed by a portable information processing terminal such as a smartphone, a tablet terminal or a personal computer, for instance. The information processing device 2 has two wireless communication functions, a first wireless communication function and a second wireless communication function. The first wireless communication function enables the wireless communication complying with short-range wireless communication standards such as NFC (Near Field Communication) and/or Bluetooth. The second wireless communication function enables the wireless communication complying with the wireless LAN standards such as WiFi. Hence, the information processing device 2 is capable of not only communicating directly with the image forming device 3a through the short-range wireless communication 9 but also communicating with each of the multiple image forming devices 3a, 3b and 3c via the wireless communicator device 4 through a wireless LAN communication 8.

When the information processing device 2 is brought within a predetermined distance where the wireless communication with the wireless communicator device 4 is enabled, it automatically detects and configures communication settings to establish the wireless communication in the local network 7. A user is allowed to enable the information processing device 2 to communicate with the wireless communicator device 4 just bringing it within the predetermined distance where the wireless communication with the wireless communicator device 4 is enabled.

When the information processing device 2 is brought within the predetermined distance where the short-range wireless communication with the image forming device 3a is enabled, it automatically detects and pairs to the image forming device 3a. The user is allowed to enable the information processing device 2 to communicate with the image forming device 3a just bringing it within the predetermined distance where the communication with the image forming device 3a is enabled.

According to the present preferred embodiment, when the user gives an instruction to print a document and/or an image stored in the information processing device 2, the information processing device 2 establishes the short-range wireless communication 9 with the image forming device 3a, thereby obtaining the IP address of the image forming device 3a in the local network 6. The information processing device 2 is configured to perform a process to search for the IP addresses of the other image forming devices 3b and 3c in the local network 6 based on the IP address of the image forming device 3a. The structure and operation of the information processing device 2 are explained in detail below.

Figure 2:
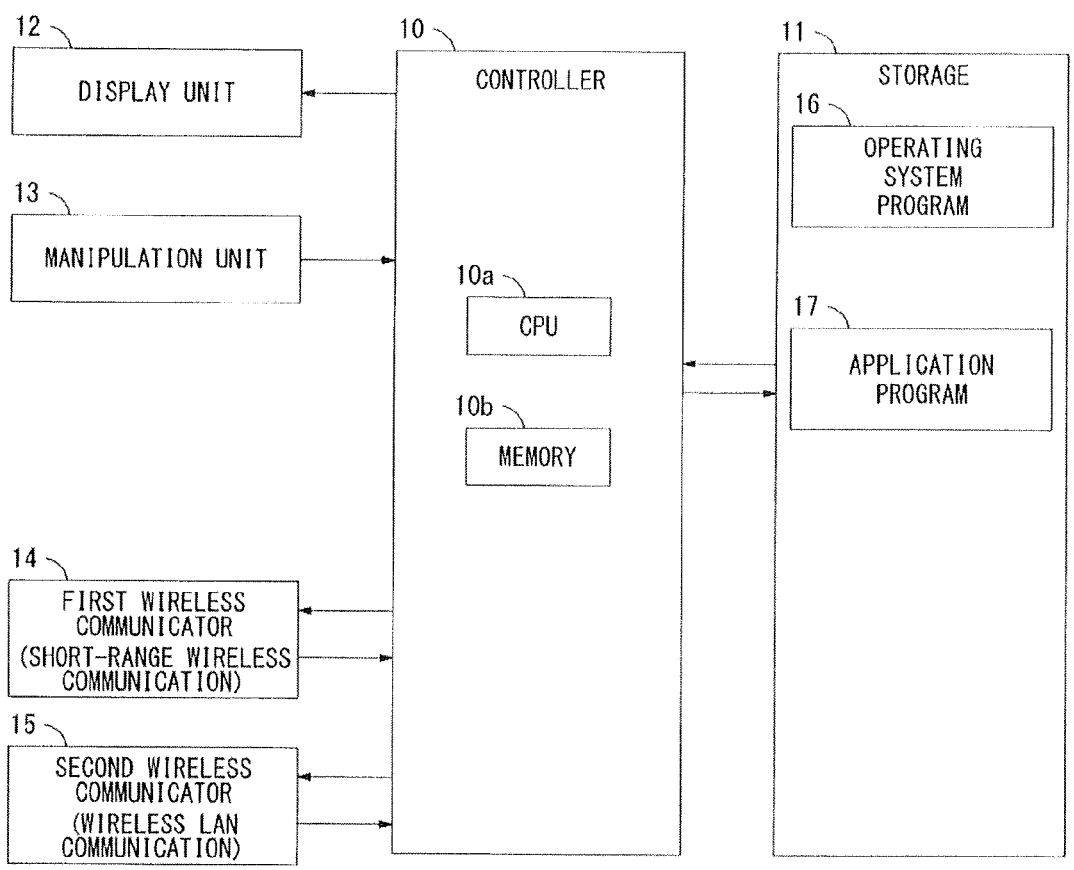
FIG. 2 is a block diagram showing an example of a hardware structure of the information processing device.

FIG. 2 is a block diagram showing an example of a hardware structure of the information processing device 2. The information processing device 2 includes a controller 10, a storage 11, a display unit 12, a manipulation unit 13, a first wireless communication unit 14 and a second wireless communication unit 15. The controller 10 includes a CPU 10a and a memory 10b, and the storage 11 is formed front a non-volatility device such as a hard disk drive (HDD) or a solid state drive (SSD). The display unit 12 is formed from a device such as a color liquid crystal display, for instance, and the manipulation unit 13 is formed with parts such as a touch panel, a keyboard and/or a mouse arranged on the screen of the display area of the display unit 12, for example. The first wireless communication unit 14 establishes the short-range wireless communication, and the second wireless communication unit 15 establishes wireless LAN communication.

An operating system program 16 and an application program 17, basic softwares of the information processing device 2, are installed in the storage 11. The application program 17 enables the information processing device 2 to work together with each of the multiple image forming devices 3a, 3b and 3c. The application program 17 searches for the image forming device 3a, 3b or 3c with which the information processing device 2 is allowed to communicate, and sends the print data to the image forming device designated by the user.

Figure 3:
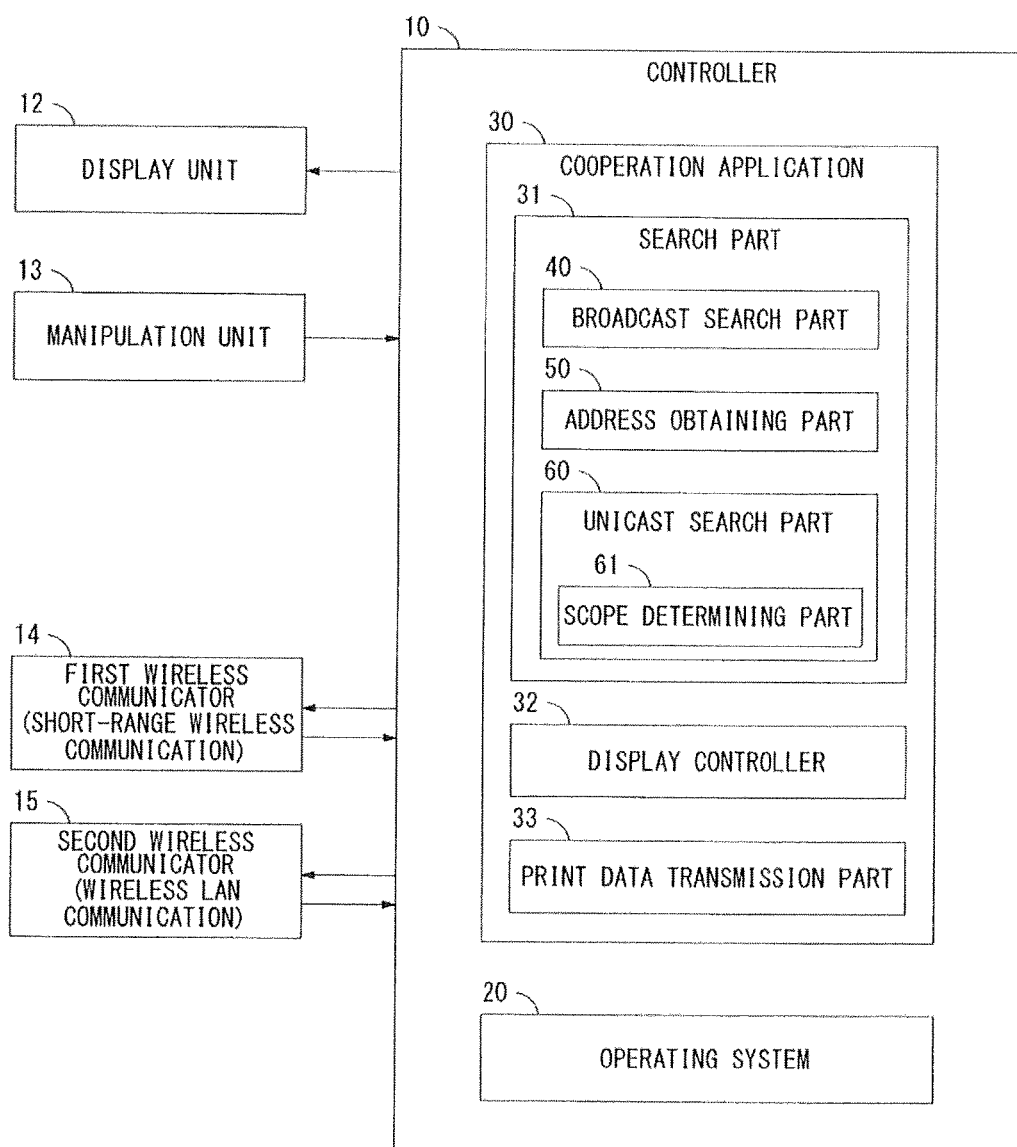
FIG. 3 is a block diagram showing an example of a functional structure of the information processing device.

FIG. 3 is a block diagram showing an example of a functional structure of the information processing device 2. The CPU 10a of the information processing device 2 is a hardware processor. The CPU 10a reads and executes the operating system program 16, thereby enabling the controller 10 to function as an operating system 20. The CPU 10a reads and executes the application program 17, thereby enabling the controller 10 to function as a cooperation application 30.

The operating system 20 monitors the first wireless communication unit 14. When detecting that the first wireless communication unit 14 has received radio wave front the image forming device 3a, the operating system 20 establishes pairing communication with the image forming device 3a via the first wireless communication unit 14. The operating system 20 then establishes the communicable connection with the image forming device 3a. The operating system 20 monitors the second wireless communication unit 15. When detecting that the second wireless communication unit 15 has received radio wave from the wireless communicator device 4, the operating system 20 obtains information relating to the local network 7 from the second wireless communication unit 15 and configures the communication settings. The IP address of the information processing device 2 is automatically assigned, and the information processing device 2 establishes the connection that enables the wireless communication in the local network 7.

The cooperation application 30 runs when an instruction to run the application program is given by the user, for example. The cooperation application 30 includes a search part 31, a display controller 32 and a print data transmission part 33. The search part 31 searches for the image forming device which it is allowed to work together. The display controller 32 controls the screen of the display unit 12 and receives user operations to the manipulation unit 13. The print data transmission part 33 sends the print data to the image forming device selected by the user.

The search part 31 is brought into operation when the cooperation application 30 runs, for example. The search part 31 searches for the image forming device that is capable of working together with the information processing device 2 in the network environment to which the information processing device 2 is connected. The search part 31 includes a broadcast search part 40, an address obtaining part 50 and a unicast search part 60. The broadcast search part 40 broadcasts a search command to search for the image forming device via the second wireless communication unit 15, thereby searching for the image forming device. The address obtaining part 50 communicates with the image forming device 3a via the first wireless communication unit 14, thereby obtaining the IP address of the image forming device 3a. The address obtaining part 50, however, is also capable of obtaining information such as network information relating to the local network 6, for instance, from the image forming device 3a besides the IP address of the image forming device 3a. The unicast search part 60 enables unicast transmission of the search command to search for the image forming device to the local network 6 to which the image forming device 3a is connected via the second wireless communication unit 15, thereby searching for the image forming device. Before enabling the unicast transmission of the search command, the unicast search part 60 is also allowed to access the IP address of the image forming device 3a via the second wireless communication unit 15 and obtain the network information related to the local network 6 front the image forming device 3a. The unicast search part 60 includes a scope determining part 61 that determines an address scope to have a unicast search. The scope determining part 61 determines a scope of the IP addresses for the unicast transmission of the search command based on the IP address of the image forming device 3a or the network information obtained from the image forming device 3a. The detail of the process performed by the search part 31 is explained next.

Figure 4A:
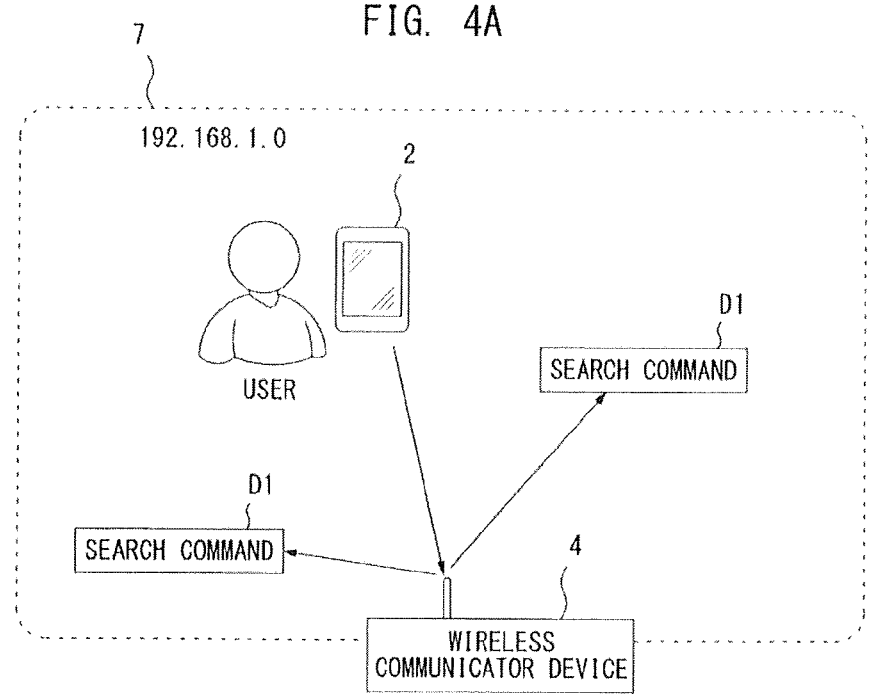
FIGS. 4A and 4B show examples of a search process performed by a broadcast search part.
Figure 4B:
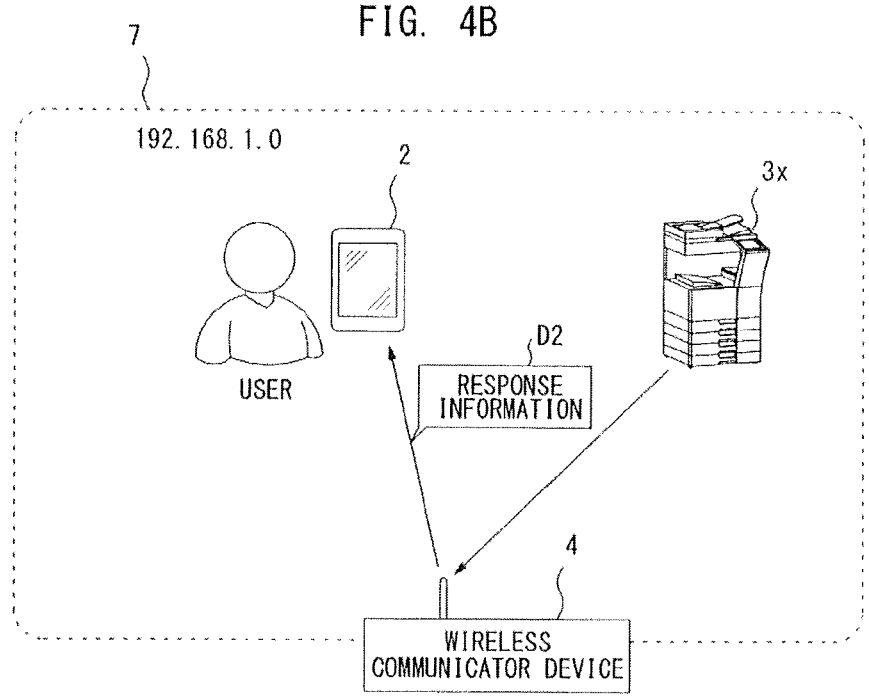

FIGS. 4A and 4B show examples of the search process performed by the broadcast search part 40. When the broadcast search part 40 becomes operative in the search part 31, the broadcast search part 40 broadcasts a search command D1 to the local network 7 based on the network address of the local network 7 as shown in FIG. 4A. In the local network 7, the second communication unit 15 communicates with the wireless communicator device 4. To be more specific, the broadcast search part 40 designates the IP address setting the string of 1s for eight-digit sequence corresponding to a host address of the IP address as the address of the search command D1. In the present preferred embodiment, the broadcast search part 40 sends the search command D1 designating the IP address "192. 168. 1. 255" as the address, thereby broadcasting to the local network 7.

As shown in FIG. 4A, the search command D1 broadcasted to the local network 7 is blocked by the wireless communicator device 4. Hence, the search command D1 is not transferred to the local network 6. To be more specific, the search command D1 is not delivered to the image forming devices 3a, 3b and 3c in the local network 6 so that the broadcast search part 40 never receives responses from the image forming devices 3a, 3b and 3c. This way of the transmission of the search command D1 cannot identity the image forming devices 3a, 3b and 3c in the local network 6.

There may be another image forming device 3x in the local network 7 to winch the search command D1 is transferred as shown in FIG. 4B. In this case, the image forming device 3x receives the search command D1 broadcasted to the local network 7, and replies response information D2 to the information processing device 2. If there is the image forming device 3x that is capable of establishing the wireless LAN communication in the local network 7, the broadcast search part 40 is allowed to detect the image forming device 3x by receiving the response information D2 from the broadcast search part 40. The broadcast search part 40 is allowed to register the image forming device 3x as the device that can be selected by the user.

Figure 5:
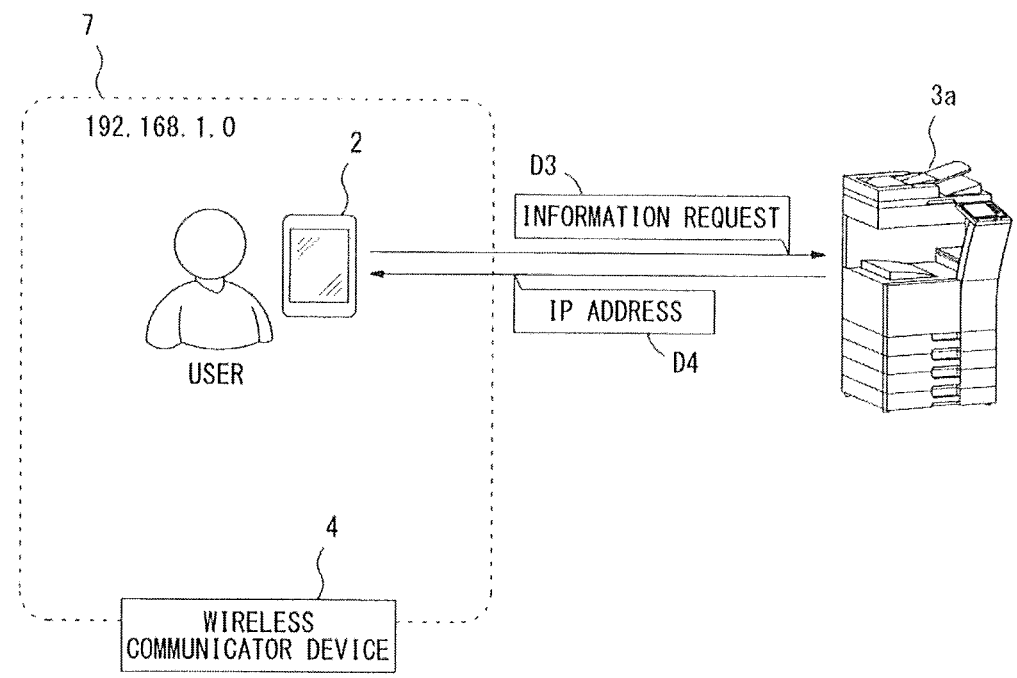
FIG. 5 shows an example of an obtaining process performed by an address obtaining part.

FIG. 5 shows an example of an obtaining process performed by the address obtaining part 50. The address obtaining part 50, for example, becomes operative in the search part 31 after the above-described search process is performed by the broadcast search part 40. The address obtaining part 50 establishes the short-range wireless communication different from the wireless LAN communication to expand the scope of the search using the search command D1, thereby communicating with the image forming device 3a connected to another local network 6. The address obtaining part 50 then obtains the IP address used when the image forming device 3a establishes the communication in another local network 6. To be more specific, the address obtaining part 50 sends an information request D3 to the image forming device 3a by establishing the short-range wireless communication as shown in FIG. 5. The image forming device 3a then reads an IP address D4 set with a communication port of the local network 6, and sends the read IP address D4 to the information processing device 2. Hence, the address obtaining part 50 is allowed to obtain the IP address D4 of the image forming device 3a directly from the image forming device 3a via the short-range wireless communication by the first wireless communication unit 14.

Figure 6A:
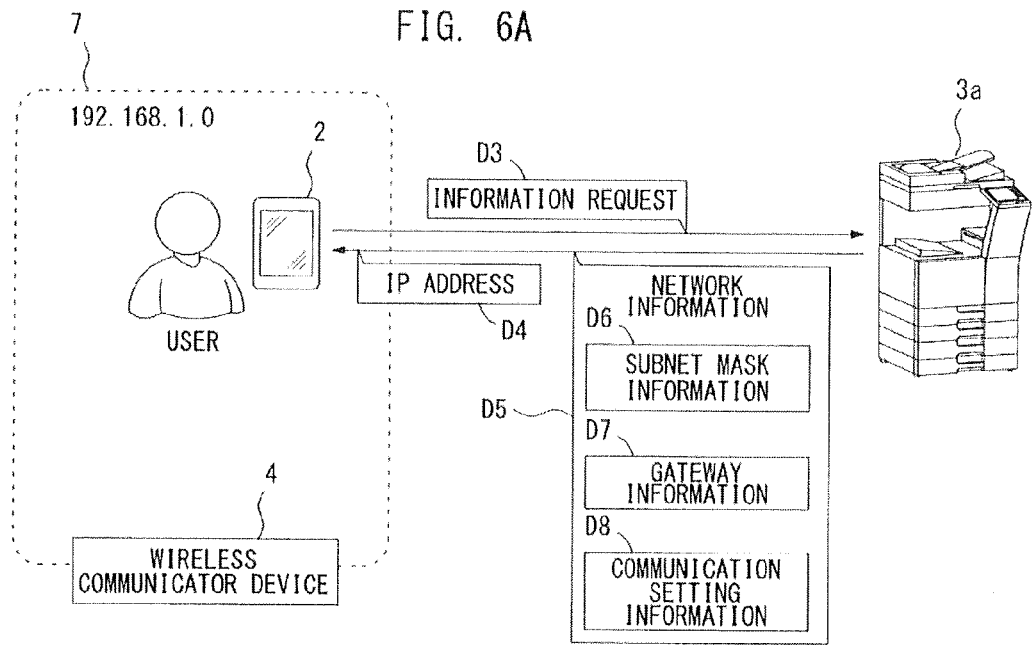
FIGS. 6A and 6B show examples of obtaining network information.
Figure 6B:
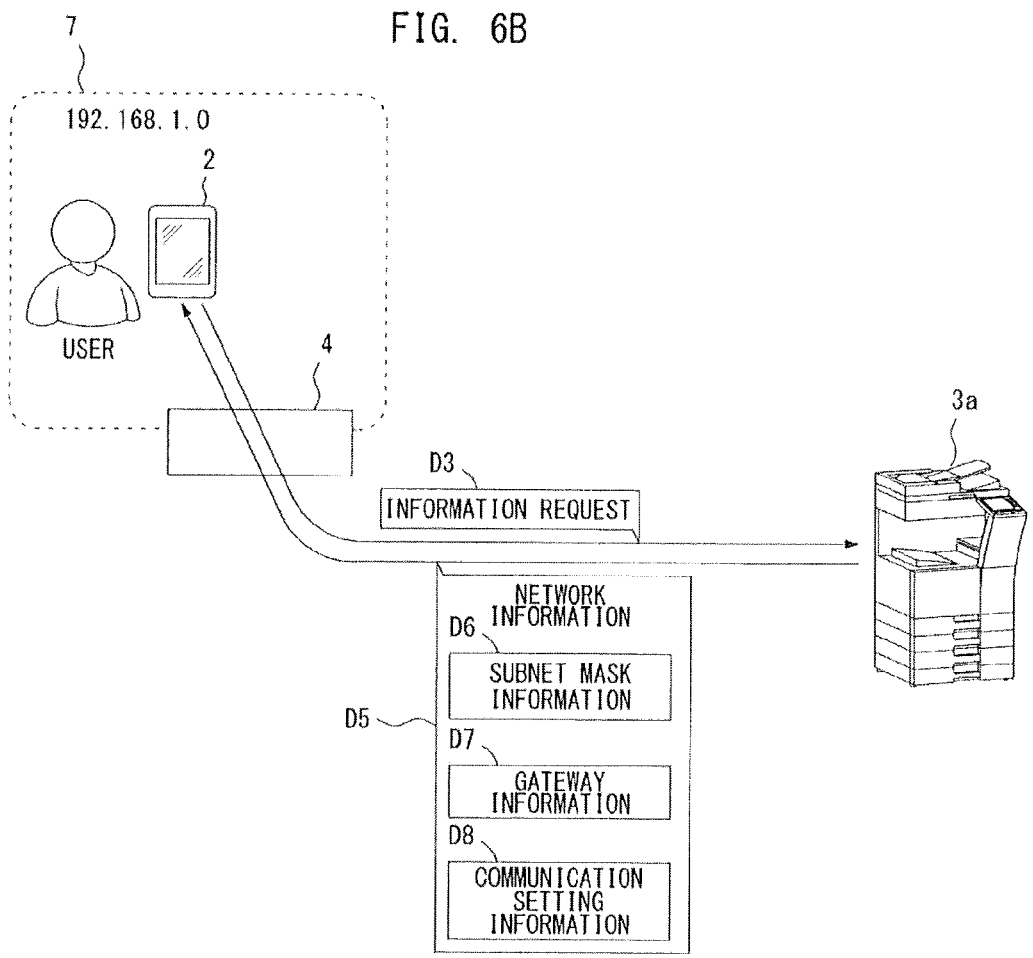

FIGS. 6A and 6B show examples of obtaining network information D5 from the image forming device 3a. As shown in FIG. 6A, the address obtaining part 50 may establish the short-range wireless communication to obtain the network information D5 relating to the local network 6 from the image forming device 3a when obtaining the IP address D4 from the image forming device 3a. The network information D5 contains subnet mask information D6, gateway information D7 and communication setting information D8.

The subnet mask information D6 divides the IP address D4 of the image forming device 3a into network address and host address. It is assumed, for example, the IP address of the image forming device 3a is "152. 17. 10. 21." In this case, if the subnet mask information is "255. 255. 255. 0." the network address should be "152. 17. 10." It is determined that the host address is "21."

The gateway information D7 shows the IP address of a gateway (such as the wireless communicator device 4) connected to the local network 6. If the gateway information D7 is obtained in advance, the IP address of the gateway can be excluded for unicast transmission of the search command by the unicast search part 60.

The communication setting information D8 is to establish communication with the image forming device 3a using a SNMP (Simple Network Management Protocol). The communication setting information D8 is required for obtaining attribution information such as a device name, equipped functions and/or an installation site stored in MIB (Management Information Base) of the image forming device 3a. The communication setting information D8 contains information such as a community name for the communication using SNMP, for example.

The network information D5 as described above may be obtained by the unicast search part 60 from the image forming device 3a after the address obtaining part 50 obtains the IP address D4 from the image forming device 3a. More specifically, the unicast search part 60 sends the information request D3 to the IP address obtained by the address obtaining part 50 via the second wireless communication unit 15 as illustrated in FIG. 6B. The information request D3 is delivered to the address of the local network 6 by unicast transmission so that it is sent to the local network 6 from the wireless communicator device 4. The information request D3 is then received by the image forming device 3a. In response to receiving the information request D3 the image forming device 3a sends the network information D5 to the information processing device 2. The unicast search part 60 is also allowed to obtain the network information D5 by communicating with the image forming device 3a.

After the network information D5 of the local network 6 is obtained as described above, the unicast search part 60 brings the scope determining part 61 into operation to determine the scope of the addresses for unicast transmission of the search command. The scope determining part 61 identifies the network address of the local network 6 from the IP address D4 of the image forming device 3a based on the subnet mask information D6. The scope determining part 61 determines the scope of the host addresses for unicast transmission. All the addresses excluding the address of the image forming device 3a, that of the gateway and that for broadcasting are included in the scope. The scope determining part 61 determines those addresses as the address scope of the unicast search. It is assumed, for example, the IP address of the image forming device 3a is "152. 17. 10. 21," and that of the gateway is "152. 17. 10. 1," for example. In this case, the scope determining part 61 determines the scope, "152. 17. 10. 2" to "152. 17. 10. 20" and "152. 17. 10. 22" to "152. 17. 10. 254," as the unicast search scope.

The unicast search part 60 then ends a search command D10 using unicast transmission to every address included in the scope determined by the scope determining part 61 as shown in FIG. 7. To be more specific, the unicast search part 60 sends the search command D10 to every address included in the scope determined by the scope determining part 61. The search command D10 is sent to the address of the local network 6 using unicast transmission so that it is also transferred to the local network 6 from the wireless communicator device 4. If the IP address designated by the search command D10 sent from the unicast search part 60 using unicast transmission matches with the IP address of the image forming device 3b, the search command D10 may be delivered and received by the image forming device 3b. Also, if the IP address designated by the search command D10 sent from the unicast search part 60 using unicast transmission matches with the IP address of the image forming device 3c, the search command D10 may be delivered and received by the image forming device 3c.

Figure 8:
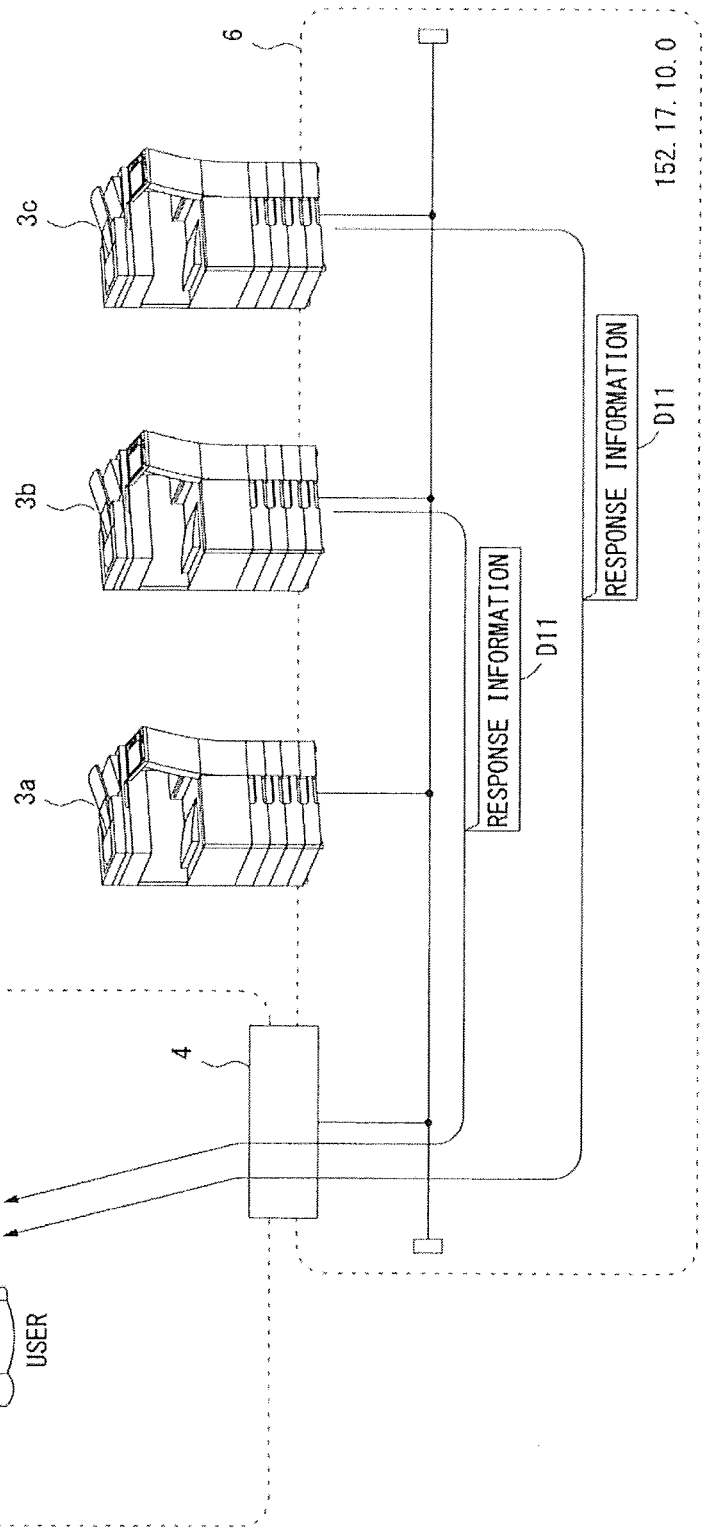
FIG. 8 shows an example of a response by an image forming device to the unicast search.

The image forming device 3b may receive the search command D10 addressed to its address from the unicast search part 60 using unicast transmission as shown in FIG. 8. In this case, the image forming device 3b sends a response information D11 to the information processing device 2. Also, the image forming device 3c may receive the search command D10 addressed to its address from the unicast search part 60 using unicast transmission. In this case, the image forming device 3c sends the response information D11 to the information processing device 2. Moreover, when the other devices in the local network 6 except for the image forming devices 3b and 3c receive the search command D10 using unicast transmission, they send the response information D11 to the information processing device 2.

After receiving the response information D11 in response to the search command D10, the unicast search part 60 analyzes the response information D11 and determines if the sender of the response information D11 is one of the image forming devices 3b and 3c that are capable of working together with the cooperation application 30. The unicast search part 60 may detect that the sender of the response information D11 is the device other than the image forming device 3b or 3c. In this case, the unicast search part 60 leaves the received response information D11. The unicast search part 60 may detect that the senders of the response information D11 are the image forming devices 3b and 3c. In this case, the unicast search part 60 registers the detected image forming devices 3b and 3c as the devices that may be selected by the user. Hence, when the multiple image forming devices 3b and 3c are connected to another local network 6 that is connected to the local network 7 via the router (the wireless communicator device 4), all of those devices may be detected by the unicast search part 60. Also, the unicast search part 60 is capable of registering those detected devices as the devices that may be selected by the user.

Figure 9:
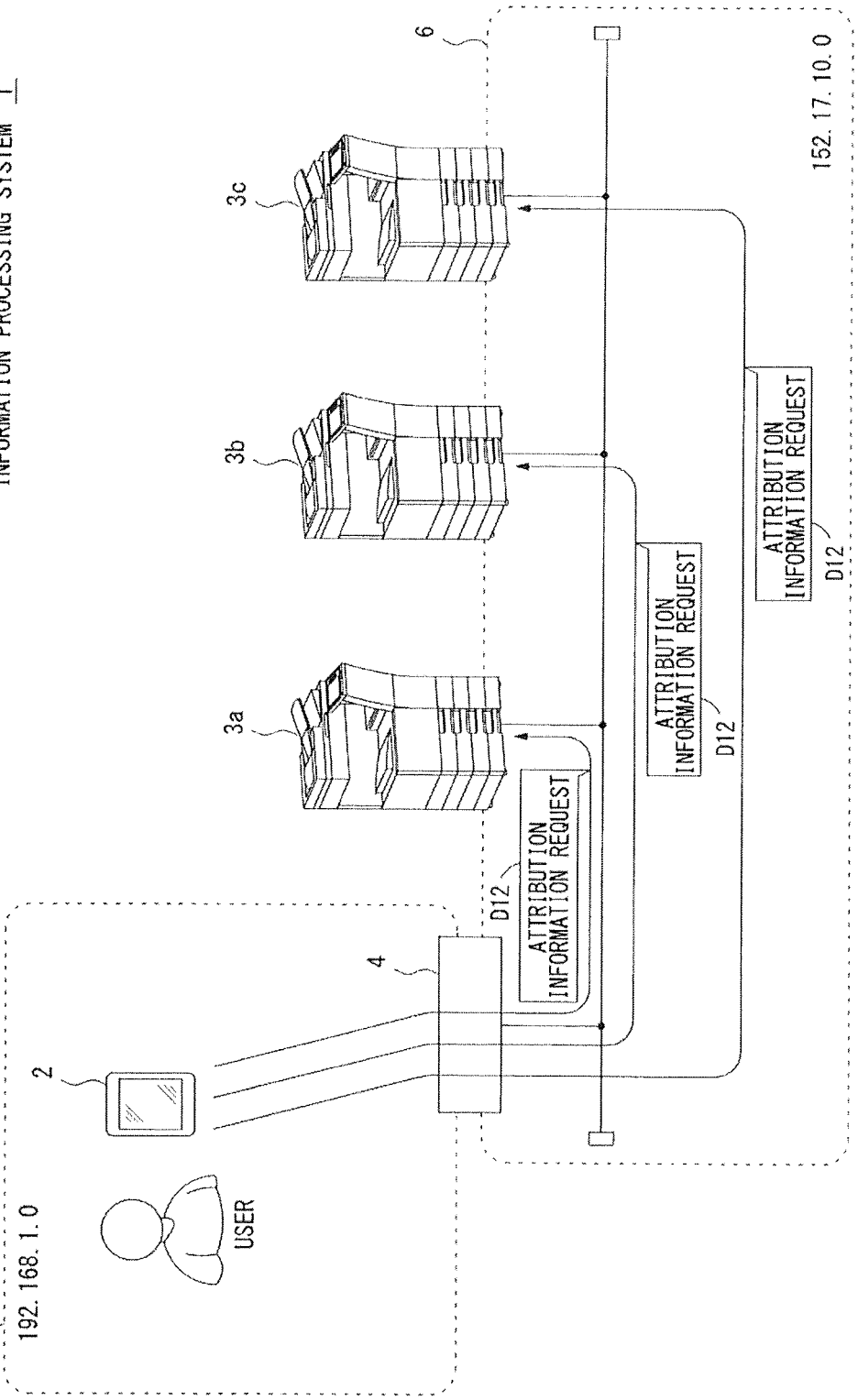
FIG. 9 shows an example of a transmission of an attribution information request by the unicast search part.

The unicast search part 60 sends an attribution information request D12 to each of the multiple image forming devices 3a, 3b and 3c detected in the local network 6 as shown in FIG. 9. More specifically, the unicast search part 60 communicates with each of the multiple image forming devices 3a, 3b and 3c using SNMP based on the communication setting information D8 in the network information D5 previously obtained front the image forming device 3a. The unicast search part 60 then requests for transmission of the attribution information relating to the details such as the device name, equipped functions and/or the installation site of each image forming device 3a, 3b and 3c. When receiving the attribution information request D12, each image forming device 3a, 3b and 3c sends attribution information D13 including information such as the device name, equipped functions and/or the installation site to the information processing device 2. As a result, the unicast search part 60 is allowed obtain the detailed information relating to each image forming device 3a, 3b and 3c connected to the local network 6.

The search part 31 of the cooperation application 30 detects the image forming device 3x in the local network 7 to which the second wireless communication unit 15 is connected. The search part 31 detects not only such image forming device 3x but also each image forming device 3a, 3b and 3c connected to another local network 6 over the router from the local network 7. Hence, the search part 31 is capable of finding more image forming devices those may be selected by the user. The above-described search way does not require installation of a specific server such as an information collecting server in the local network 6, avoiding the complicated system structure of the information processing system 1. Also, this search way realizes easy and reasonable collecting information of the image forming devices 3a, 3b and 3c.

When the information relating to each image forming device 3a, 3b and 3c is collected by the search part 31, the display controller 32 becomes operative in the cooperation application 30. The display controller 32 creates a screen showing the information relating to each image forming device 3a, 3b and 3c detected by the search part 31 in a list form, and displays the created screen on the display unit 12.

Figure 11:
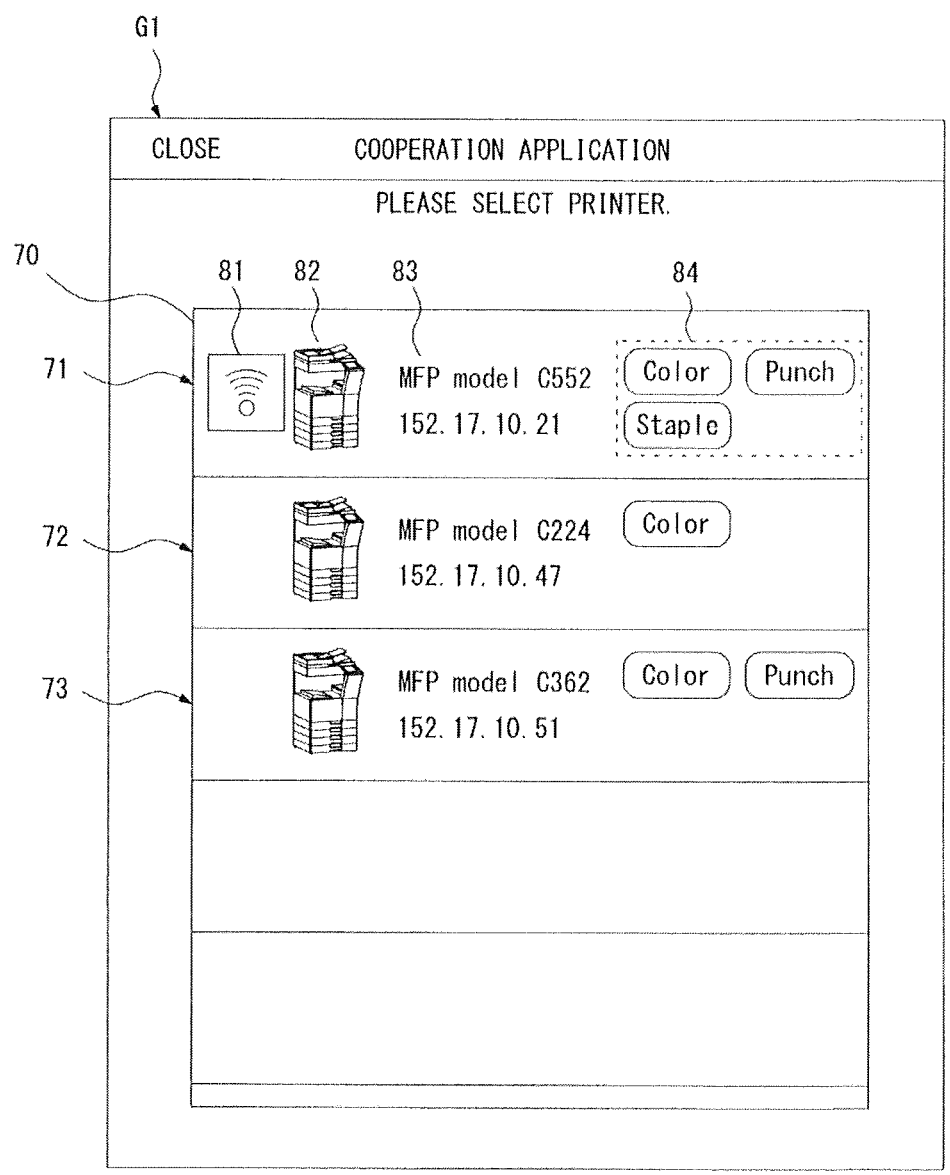
FIG. 11 shows an example of a list screen displayed on the information processing device.

FIG. 11 shows an example of a list screen G1. As illustrated in FIG. 11, the list screen G1 includes a list area 70 in the center of the screen. Device information 71, 72 and 73 corresponding to the respective image forming devices 3a, 3b and 3c detected by the search part 31 is displayed in the list area 70. In the example of FIG. 11, the device information 71 corresponds to the image forming device 3a, the device information 72 corresponds to the image forming device 3b and the device information 73 corresponds to the image forming device 3c. An icon image 82 of the corresponding image forming device 3a, 3b or 3c, text information 83 showing information such as the device name, the IP address and/or the installation site of the corresponding image forming device 3a, 3b or 3c and function information 84 of the corresponding image forming device 3a, 3b or 3c are included in each device information 71, 72 and 73. The address obtaining 50 has currently communicated with the image forming device 3a using the short-range communication. The device information 71 corresponding to such image forming device 3a additionally includes an image 81 showing that the short-range wireless communication has been established with the device. Such device information 71 is displayed differently from the other device information 72 and 73. If the user sees the device information 71, 72 and 73 in the list screen G1, he or she may find out the name, the installation site and/or the equipped functions of each image forming device 3a, 3b and 3c. The image 81 is added to the device information 71 corresponding to the image forming device 3a with which the address obtaining part 50 has communicated using the short-range wireless communication. The user is, therefore, allowed to find out that the image forming device 3a corresponding to the device information 71 is placed relatively near the information processing device 2 of the multiple image forming devices 3a, 3b and 3c. As a result, the user is allowed to choose one of the image forming devices best for the address of the print data by considering the functions and/or the installation sites of the image forming devices 3a, 3b and 3c once the list screen G1 is displayed on the display unit 12.

After displaying the list screen G1 on the display unit 12, the display controller 32 receives the selecting operation by the user. The display controller 32 determines one of the image forming devices that is the address of the print data based on the selecting operation. The display controller 32 then informs the print data transmission part 33 of the IP address of the determined image forming device.

The print data transmission part 33 sends the print data to one of the image forming devices selected by the user. The print data transmission part 33, for example, reads data to print such as the document and/or the image specified by the user, and generates a print job based on the data to print. The print data transmission part 33 may receive print setting operation by the user and generate the print job to which the print setting configured by the user is applied. The print data transmission part 33 sends the print job to the IP address of one of the image forming devices selected by the user. The print job is transferred to the local network 6 from the local network 7 via the wireless communicator device 4 and delivered to one of the image forming devices selected by the user. The image forming device selected by the user executes the print job, and produces the printed document and/or image.

Figure 12:
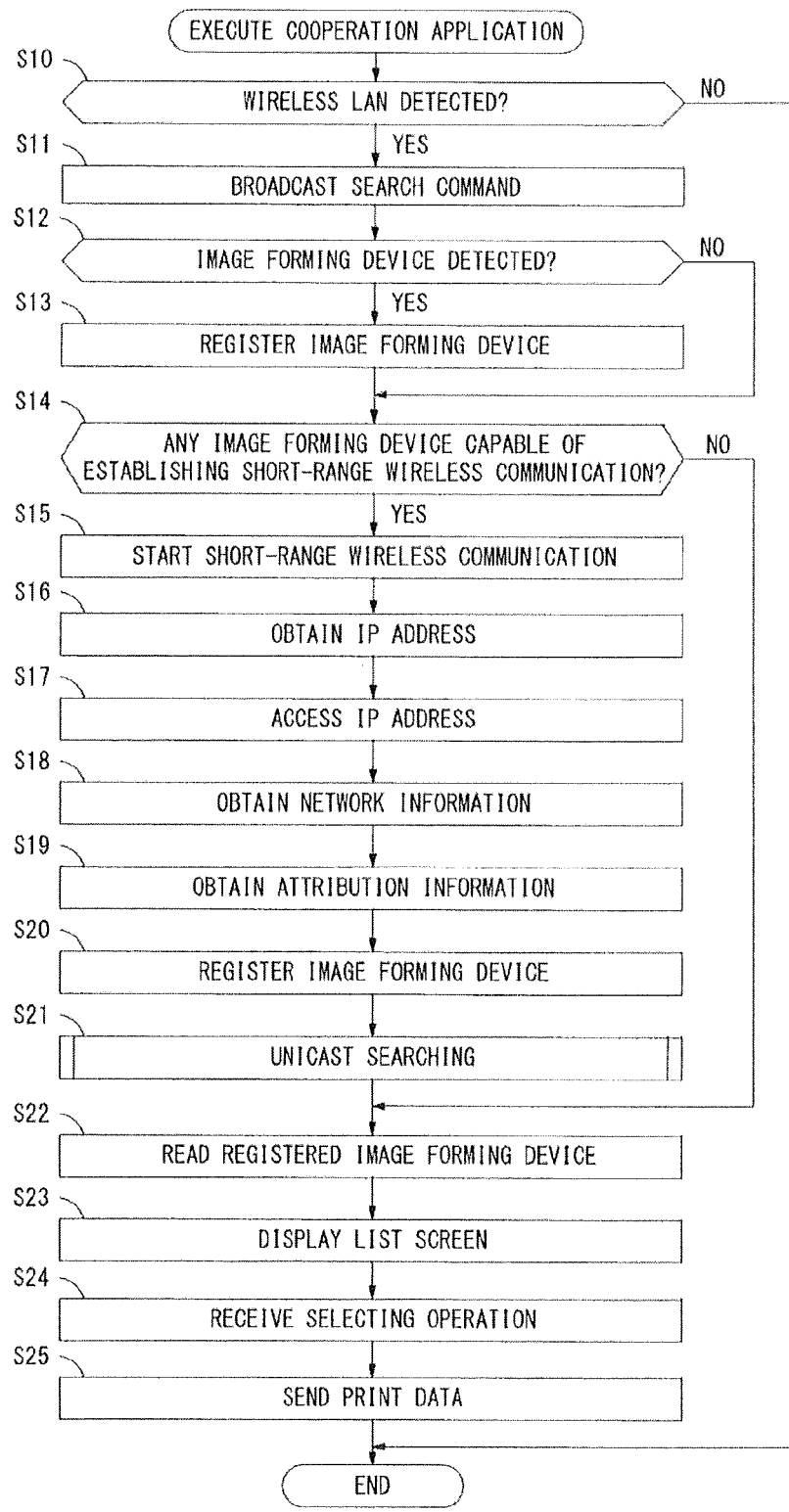
FIG. 12 is a flow diagram explaining an exemplary procedure of the process performed when a cooperation application is run on the information processing device.
Figure 13:
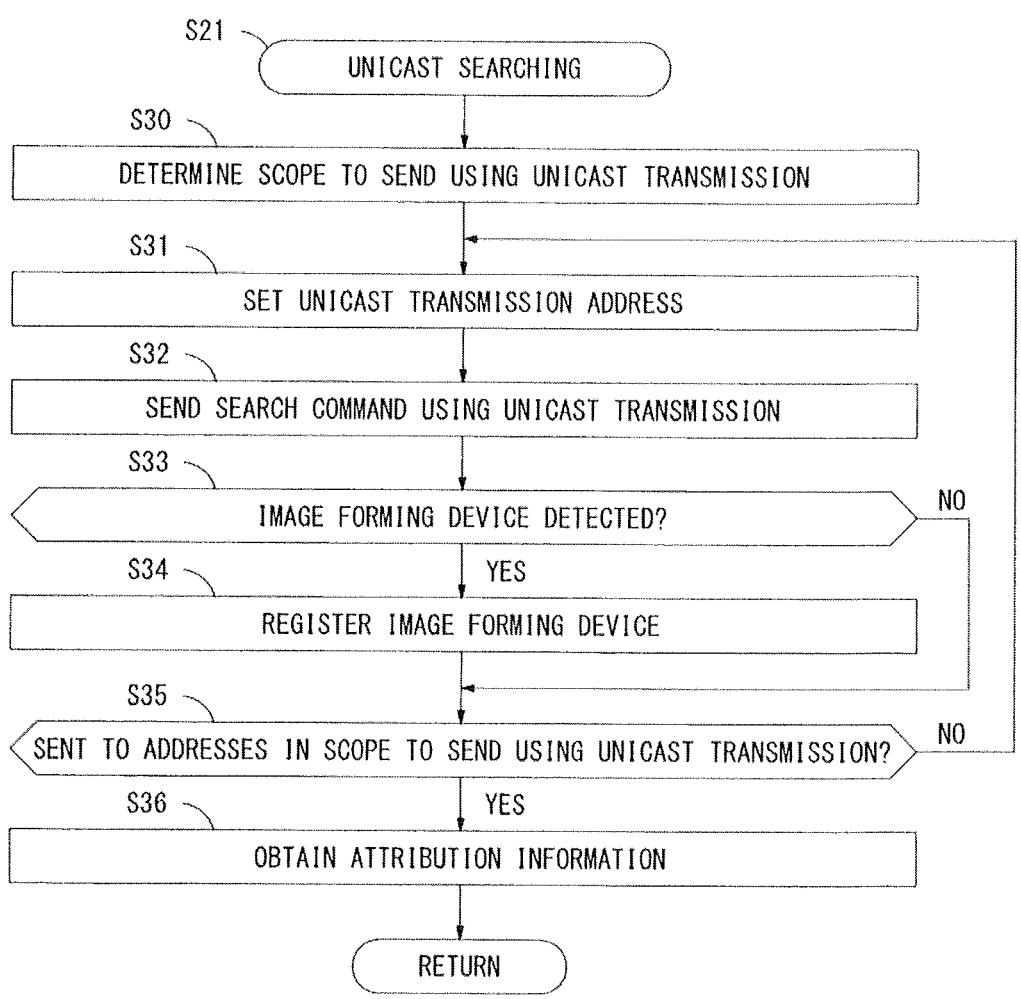
FIG. 13 is a flow diagram explaining in detail an exemplary procedure of a unicast searching.

The detailed procedure of a process performed in the information processing device 2 is explained next. FIGS. 12 and 13 are flow diagrams explaining an exemplary procedure of the process performed when the cooperation application 30 is run on the information processing device 2. After starting the process, the cooperation application 30 determines if the wireless LAN is detected by the operating system 20 (step S10). The operating system 20 may not be detecting the wireless LAN (when a result of step S10 is NO). In this case, the print data cannot be sent so that the process by the cooperation application 30 is complete. When the operating system 20 is detecting the wireless LAN (when a result of step S10 is YES), the cooperation application 30 broadcasts the search command D1 to the local network 7 via the second wireless communication unit 15 (step S11). The cooperation application 30 receives the response information D2 from the image forming device 3x in the local network 7 and detects the image forming device 3x (when a result of step S12 is YES). The cooperation application 30 then registers the detected image forming device 3x as one of the addresses to which the print data can be sent (step S13). The cooperation application 30 preferably registers the image forming device 3x together with the attribution information such as the device name, equipped functions and/or the installation site by obtaining the attribution information from the image forming device 3x. The image forming device may not be detected by broadcasting the search command D1 (when a result of step S12 is NO). In this case, the process in step S13 is not performed.

The cooperation application 30 determines if there is the image forming device 3a with which the short-range wireless communication may be established (step S14). To be more specific, the cooperation application 30 determines if there is the image forming device 3a with which the short-range wireless communication by the operating system 20 may be established. There may be the image forming device 3a with which the short-range wireless communication may be established (when a result of step S14 is YES). In this case, the cooperation application 30 starts the short-range wireless communication with the image forming device 3a (step S15). The cooperation application 30 then obtains the IP address of the image forming device 3a (step S16).

The cooperation application 30 accesses the IP address obtained via the second wireless communication unit 15 in step S16 (step S17), and obtains the network information D5 from the image forming device 3a (step S18). However, this is given not for limitation. The cooperation application 30 may obtain the network information D5 from the image forming device 3a by establishing the short-range wireless communication with the image forming device 3a. After obtaining the network information D5, the cooperation application 30 establishes the communication using the SNMP with the image forming device 3a, and obtains the attribution information D13 such as the device name, equipped functions and/or the installation site from the image forming device 3a (step S19). The cooperation application 30 then registers the image forming device 3a as one of the addresses to which the print data can be sent (step S20).

The cooperation application 30 performs the unicast searching next (step S21). FIG. 13 is a flow diagram explaining in detail an exemplary procedure of the unicast searching (step S21). Upon start of the process, the cooperation application 30 determines the scope of the addresses to send the search command D10 using the unicast transmission (step S30). The scope of the addresses adding the host address excluding the IP addresses of the image forming device 3a, the gateway and the broadcasting to the network address of the local network 6 is determined as the scope of the addresses to send the search command D10 using the unicast transmission. The cooperation application 30 sets one of the IP addresses included in the scope as the unicast transmission address (step S31), and sends the search command D10 using the unicast transmission (step S32). The cooperation application 30 then receives the response information D11 from the image forming device 3b or 3c in the local network 6, thereby detecting the image forming device 3b or 3c (when a result of step S33 is YES). The cooperation application 30 registers the image forming device 3b or 3c as one of the addresses to which the print data can be sent (step S34). The cooperation application 30 may not be allowed to detect the image forming device by sending the search command D10 using the unicast transmission (when a result of step S33 is NO). In this case, the process in step S34 is skipped. The cooperation application 30 determines if the search command D10 has sent to all IP addresses included in the scope determined in step S30 using the unicast transmission (step S35). There may be the IP address to which the search command D10 has not sent (when a result of step S35 is NO). In such a case, the above-described process is repeatedly performed by returning to step S31. The search command D10 may have been sent to all IP addresses included in the scope using the unicast transmission (when a result of step S35 is YES), the cooperation application 30 establishes the communication using the SNMP with each image forming device 3b and 3c detected in the local network 6, and obtains the attribution information D13 such as the device name, equipped functions and/or the installation site from each image forming device 3b and 3c (step S36). The unicast searching is thus complete.

Referring back to the flow diagram of FIG. 12, there may be no image forming device 3a with which the short-range wireless communication may be established (when a result of step S14 is NO). In this case, the above-described process in steps S15 to S21 is skipped.

The cooperation application 30 reads the information rotating to the image forming devices 3a, 3b and 3c registered in the previous process (step S22). The cooperation application 30 creates the list screen G1 and displays on the display unit 12 (step S23). The cooperation application 30 receives the operation to select the image forming device by the user (step S24), and sends the print data to one of the image forming devices selected by the user (step S25). As described above, the process performed by the cooperation application 30 is thus complete.

Even when the cooperation application 30 tries to access the IP address obtained in step S16, it may not be able to connect to the image forming device 3a in the above-described step S17. Sometimes, the image forming device 3a includes the wireless communication unit complying with the wireless LAN standards such as WiFi, and the wireless communication unit forms the local network different from the local network 7. The IP address obtained in step S16 may be the one set with the port which establishes the wireless communication by the wireless communication unit. In such a case, even when the cooperation application 30 accesses the IP address obtained in step S16, it is not allowed to connect to the image forming device 3a. If it is not allowed to connect to the image forming device 3a, the cooperation application 30 may not be necessary to send the search command D10 using the unicast transmission. As a result, unnecessary unicast transmission is not required, resulting in the enhanced process efficiency by the cooperation application 30.

If the cooperation application 30 is not allowed to connect to the image forming device 3a, it may establish again the short-range wireless communication with the image forming device 3a. The cooperation application 30 then may be allowed to obtain the function information of the image forming device 3a, and determine if the image forming device 3a includes the wireless communication unit that establishes the wireless LAN communication. The image forming device 3a may include the wireless communication unit. In this case, the cooperation application 30 obtains the communication setting of the wireless LAN communication established by the wireless communication unit from the image forming device 3a. The cooperation application 30 then performs the process to rewrite the communication setting of the wireless LAN communication managed by the operating system 20. As a result, the operating system 20 rewrites the communication setting of the wireless LAN communication to the communication setting of the local network to which the image forming device 3a is connected. The cooperation application 30 is then allowed to access the IP address of the image forming device 3a, and it is at least allowed to register the image forming device 3a as one of the addresses to which the print data can be sent. The cooperation application 30 is also allowed to obtain the information relating to the other image forming devices by broadcasting the search command D10 to the local network which is formed by the wireless communication unit of the image forming device 3a.

As described above, after obtaining the IP address of the image forming device 3a, the cooperation application 30 starts to send the search command D10 to search for the image forming devices 3b and 3c in the local network 6 using the unicast transmission. However, this is given not for limitation. The cooperation application 30 may broadcast the search command D10 to the local network 6 before sending the search command D10 to the devices in the local network 6 using the unicast transmission. To be more specific, the cooperation application 30 brings again the broadcast search part 40 into operation again to send the search command D10 to the IP address "152. 17. 10. 255." It depends on the router settings of the wireless communicator device 4 whether or not the search command D10 thereby sent passes the wireless communicator device 4 and transferred to the local network 6. More specifically, it may allow the cooperation application 30 to detect the image forming devices 3a, 3b and 3c by broadcasting the search command to the local network 6. If the cooperation application 30 is allowed to detect the image forming devices 3a, 3b and 3c by broadcasting before sending the search command D10 using the unicast transmission, the unicast transmission is not necessary. The efficient process performed by the cooperation application 30 is realized.

As described above, the information processing device 2 of the present preferred embodiment includes the first wireless communication unit 14 that establishes the short-range wireless communication with the first image forming device 3a in the local network 6 and the second wireless communication unit 15 that establishes the wireless communication with the wireless communicator device 4 connected to the local network 6. The information processing device 2 enables the first wireless communication unit 14 to establish the short-range wireless communication with the first image forming device 3a, thereby obtaining the IP address of the first image forming device 3a in the local network 6. The information processing device 2 then enables the second wireless communication unit 15 to send the search command D10 to search the second image forming devices 3b and 3c in the local network 6 to the local network 6 using the unicast transmission via the wireless communicator device 4 based on the obtained IP address.

As described above, the image forming devices 3a, 3b and 3c are connected to the local network 6 different from the local network 7 in which the second wireless communication unit 15 establishes the wireless communication. Even in such a case, the information processing device 2 sends the search command D10 to the local network 6 using the unicast transmission so that it is allowed to detect the image forming devices 3a, 3b and 3c. The above-described search way does not require the installation of the specific server in the information processing system 1. The information relating to the image forming devices 3a, 3b and 3c may be collected easily and reasonably.

As described above, the information processing device is allowed to collect the information of the image forming device in easy and reasonable way without the need for the installation of any specific information collecting server in each local network.

Although the embodiment of the present invention has been described and illustrated in detail, it is clearly understood that the same is by way of illustration and example only and not limitation, the scope of the present invention should be interpreted by terms of the appended claims.

MODIFICATIONS

While the preferred embodiment of the present invention has been described above, the present invention is not limited to the preferred embodiment. Various modifications may be applied to the present invention.

In the above-described present preferred embodiment, for example, the cooperation application 30 searches for the image forming devices 3a, 3b and 3c to be the destination of the print data. However, this is given not for limitation. The image forming devices 3a, 3b and 3c searched by the cooperation application 30 is not always used as the destinations of the print data. More specifically, the cooperation application 30 is only required to execute the job by working together with the image forming devices 3a, 3b and 3c detected in the above-described search way. The job should not always be the print job. The job may be the scan job or the fax job, for instance.

What is claimed is:

1. An information processing device includes a first wireless communication device that establishes a short-range wireless communication with a first image forming device in a local network and a second wireless communication device that establishes a wireless communication with a wireless communication device connected to said local network, comprising a hardware processor that:
   enables said first wireless communication device to establish the short-range wireless communication with said first image forming device, thereby obtaining an IP address of said first image forming device in said local network; and
   enables said second wireless communication device to send a search command for searching for a second image forming device in said local network to each of a multiple IP addresses in said local network except for the IP address of said first image forming device using unicast transmission via said wireless communication device based on the IP address of said first image forming device.

2. The information processing device according to claim 1, wherein
   said hardware processor enables said second wireless communication device to communicate with said first image forming device in said local network via said wireless communication device based on the IP address of said first image forming device to obtain network information relating to said local network from said first image forming device and determine a scope of addresses to send said search command using unicast transmission based on the network information.

3. The information processing device according to claim 2, wherein
   the network information contains communication setting information used for communication using a predetermined protocol with said first image forming device, and
   said hardware processor establishes communication based on said communication setting information with said second image forming device detected by sending said search command using unicast transmission, thereby obtaining attribution information relating to said second image forming device from said second image forming device.

4. The information processing device according to claim 3, wherein
said hardware processor creates the screen showing said first image forming device with which said first wireless communication device established the short-range wireless communication and said second image forming device detected by sending said search command in the list form, and displays the created screen on the predetermined display with adding device information based on said attribution information to said second image forming device on the list of said screen.

5. The information processing device according to claim 1, wherein
said hardware processor obtains the network information relating to said local network when obtaining the IP address of said first image forming device in said local network, and
said hardware processor determines the scope of addresses to send said search command using unicast transmission based on the network information.

6. The information processing device according to claim 1, wherein
said hardware processor creates a screen showing said first image forming device with which said first wireless communication device established the short-range wireless communication and said second image forming device detected by sending said search command in a list form, and displays the created screen on a predetermined display.

7. The information processing device according to claim 6, wherein
said hardware processor creates the list screen which is configured to show said first image forming device and said second image forming device in a different manner.

8. The information processing device according to claim 6, wherein
said hardware processor enables said second wireless communication device to send print data to one of said image forming devices on the list via said wireless communication device when said one of said image forming devices is selected by a user as the list screen is displayed.

9. The information processing device according to claim 1, wherein
said hardware processor accesses the IP address of said first image forming device, thereby determining if it is allowed to connect with said first image forming device, and does not send said search command using the unicast transmission based on the IP address when it is not allowed to connect with said first image forming device.

10. The information processing device according to claim 1, wherein
said hardware processor enables said second wireless communication device to broadcast said search command to said local network via said wireless communication device before sending said search command from said second wireless communication device to said local network using unicast transmission via said wireless communication device, and said hardware processor does not send said search command using unicast transmission when said second image forming device is detected by said search command broadcasted.

11. The information processing device according to claim 1, wherein
said information processing device is installed in a second local network which is different from a first local network in which said first and second image forming devices are installed, and
said wireless communication device mediates said first local network and said second local network.

12. A non-transitory recording medium storing a computer readable program to be executed by an information processing device that includes:
a first wireless communication device that establishes a short-range wireless communication with a first image forming device in a local network; and
a second wireless communication device that establishes a wireless communication with a wireless communication device connected to said local network, wherein execution of the computer readable program by said information processing device causing said information processing device to perform:
enabling said first wireless communication device to establish the short-range wireless communication with said first image forming device, thereby obtaining an IP address of said first image forming device in said local network; and
enabling said second wireless communication device to send a search command for searching for a second image forming device in said local network to each of a multiple IP addresses in said local network except for the IP address of said first image forming device using unicast transmission via said wireless communication device based on the IP address of said first image forming device.

13. The non-transitory recording medium according to claim 12, wherein execution of the computer readable program by said information processing device causing said information processing device to further perform:
enabling said second wireless communication device to communicate with said first image forming device in said local network via said wireless communication device based on the IP address of said first image forming device to obtain network information relating to said local network from said first image forming device, and determining a scope of addresses to send said search command using unicast transmission based on the network information.

14. The non-transitory recording medium according to claim 13, wherein
the network information contains communication setting information used for communication using a predetermined protocol with said first image forming device, and execution of the computer readable program by said information processing device causing said information processing device to further perform communicating with said second image forming device detected by sending said search command using unicast transmission based on said communication setting information, thereby obtaining attribution information relating to said second image forming device from said second image forming device.

15. The non-transitory recording medium according to claim 14, wherein execution of the computer readable program by said information processing device causing said information processing device to further perform:

creating the screen showing said first image forming device with which said first wireless communication device established the short-range wireless communication and said second image forming device detected by sending said search command using unicast transmission in the list form, and displaying the created screen on the predetermined display.

16. The non-transitory recording medium according to claim 12, wherein execution of the computer readable program by said information processing device causing said information processing device to further perform:

obtaining the network information relating to said local network when the IP address of said first image forming device in said local network is obtained, and determining the scope of addresses to send said search command using unicast transmission based on the network information.

17. The non-transitory recording medium according to claim 12, wherein execution of the computer readable program by said information processing device causing said information processing device to further perform:

creating a screen showing said first image forming device with which said first wireless communication device established the short-range wireless communication and said second image forming device detected by said search command in a list form, and displaying the created screen on a predetermined display.

18. The non-transitory recording medium according to claim 17, wherein the list screen which is configured to show said first image forming device and said second image forming device in a different manner is created.

19. The non-transitory recording medium according to claim 17, wherein execution of the computer readable program by said information processing device causing said information processing device to further perform:

enabling said second wireless communication device to send print data to one of said image forming devices on the list via said wireless communication device when said one of said image forming devices is selected by a user as the list screen is displayed.

20. The non-transitory recording medium according to claim 12, wherein execution of the computer readable program by said information processing device causing said information processing device to further perform:

determining if it is allowed to connect with said first image forming device by accessing the IP address of said first image forming device, and when it is not allowed to connect with said first image forming device, said search command based on the IP address is not sent using unicast transmission.

21. The non-transitory recording medium according to claim 12, wherein execution of the computer readable program by said information processing device causing said information processing device to further perform:

enabling said second wireless communication device to broadcast said search command to said local network via said wireless communication device before said second wireless communication device is enabled to send said search command to said local network using unicast transmission via said wireless communication device, wherein said search command is not sent using unicast transmission when said second image forming device is detected by said search command broadcasted.

* * * * *